United States Patent
Haumer et al.

(10) Patent No.: US 10,956,436 B2
(45) Date of Patent: Mar. 23, 2021

(54) REFINING SEARCH RESULTS GENERATED FROM A COMBINATION OF MULTIPLE TYPES OF SEARCHES

(71) Applicant: INTERNATIONAL BUSINESS MACHINES CORPORATION, Armonk, NY (US)

(72) Inventors: Peter Haumer, San Jose, CA (US); Gary I. Mazo, San Jose, CA (US); Sanket Parikh, Sunnyvale, CA (US); Milandeep S. Shergill, Brampton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

(21) Appl. No.: 15/955,384

(22) Filed: Apr. 17, 2018

(65) Prior Publication Data
US 2019/0318030 A1   Oct. 17, 2019

(51) Int. Cl.
*G06F 16/00* (2019.01)
*G06F 16/248* (2019.01)
*G06F 16/28* (2019.01)
*G06F 16/338* (2019.01)
(Continued)

(52) U.S. Cl.
CPC .......... *G06F 16/248* (2019.01); *G06F 16/285* (2019.01); *G06F 16/338* (2019.01); *G06F 16/3325* (2019.01); *G06F 16/3349* (2019.01)

(58) Field of Classification Search
CPC .. G06F 16/3349; G06F 16/285; G06F 16/248; G06F 16/3325; G06F 16/338
See application file for complete search history.

(56) References Cited

U.S. PATENT DOCUMENTS

| 7,831,608 B2 | 11/2010 | Aizenbud-Reshef et al. |
| 7,949,654 B2 | 5/2011 | Das et al. |
| 8,156,101 B2 | 4/2012 | Indeck et al. |

(Continued)

OTHER PUBLICATIONS

Collin McMillan, Mark Grechanik, Denys Poshyvanyk, Chen Fu, and Qing Xie, "Exemplar: A Source Code Search Engine for Finding Highly Relevant Applications", IEEE Transactions on Software Engineering, vol. 38, No. 5, Sep./Oct. 2012, pp. 1069-1087. (Year: 2012).*

(Continued)

*Primary Examiner* — Cheryl Lewis
(74) *Attorney, Agent, or Firm* — Teddi Maranzano, Esq.; Blanche E. Schiller, Esq.; Heslin Rothenberg Farley & Mesiti P.C.

(57) ABSTRACT

A computer program is searched for one or more select terms. A first type of search is performed on source code of the computer program to search for one or more select terms in the source code. Results of the first type of search, if any, are included in a result set. A second type of search is performed on one or more particular elements of the computer program to search for the one or more select terms in the one or more particular elements. Results of the second type of search, if any, are added to the result set. Another search is performed, based on analysis of the result set. The other search searches for the one or more select terms in one or more selected source artifacts of the computer program to provide a refined result set. An action is performed using the refined set.

20 Claims, 10 Drawing Sheets

(51) Int. Cl.
*G06F 16/332* (2019.01)
*G06F 16/33* (2019.01)

(56) References Cited

U.S. PATENT DOCUMENTS

| | | | |
|---|---|---|---|
| 8,566,789 B2 | 10/2013 | Siddaramappa et al. | |
| 8,666,999 B2 | 3/2014 | Havel et al. | |
| 8,930,389 B2 | 1/2015 | Sloan | |
| 9,251,208 B2 | 2/2016 | Deng et al. | |
| 9,721,016 B2 | 8/2017 | Gruber | |
| 9,830,389 B2 | 11/2017 | Rothschild | |
| 10,331,441 B2* | 6/2019 | Carmack | G06F 8/73 |
| 2002/0055919 A1 | 5/2002 | Mikheev | |
| 2003/0033275 A1 | 2/2003 | Alpha et al. | |
| 2005/0262056 A1* | 11/2005 | Hamzy | G06F 8/36 |
| 2007/0061294 A1 | 3/2007 | Parnell et al. | |
| 2008/0243799 A1 | 10/2008 | Rozich et al. | |
| 2011/0161333 A1 | 1/2011 | Langseth et al. | |
| 2012/0254162 A1* | 10/2012 | Asadullah | G06F 8/75 707/723 |
| 2012/0254835 A1* | 10/2012 | Muddu | G06F 8/75 717/121 |
| 2013/0282710 A1 | 10/2013 | Raghavan et al. | |
| 2015/0161266 A1* | 6/2015 | Conradt | G06F 16/9535 707/706 |
| 2018/0081881 A1* | 3/2018 | Poddar | G06F 16/24578 |

OTHER PUBLICATIONS

Grace Period Disclosure—IBM Publication, "IBM Application Delivery Intelligence V5.0.4," https://www.ibm.com/support/knowledgecenter/en/SSKK7E_5.0.4/com.ibm.adi.product.doc/topics/topiclink.html, (Dec. 14, 2017) pp. 1-33.

Grace Period Disclosure—IBM Publication, "Performing the Business Terms Discovery," https://www.ibm.com/support/knowledgecenter/en/SSKK7E_5.0.4/com.ibm.adi.product.doc/topics/bizdisctut.html, (Dec. 14, 2017) pp. 1-23.

Mell, Peter and Tim Grance, "The NIST Definition of Cloud Computing," National Institute of Standards and Technology, Information Technology Laboratory, Special Publication 800-145, Sep. 2011, pp. 1-7.

IBM, "z/Architecture—Principles of Operation," IBM Publication No. SA22-7832-10, Eleventh Edition, Mar. 2015, pp. 1-1732.

IBM, "Power ISA—V2.07B," Apr. 9, 2015, pp. 1-1527.

Rao, Ramona, "From Unstructured Data to Actionable Intelligence," IEEE Computer Society, Nov./Dec. 2003, pp. 29-35.

* cited by examiner

Example interaction

Initial search request:   200

GET /adi/search/eartifact?query=(offset=0 | limit=10 | term=patient) &filterParams=()

Call Parameters:
term: Term to search for
offset: Artifact index to start search at
limit: Number of search results to return
filterParameters: On initial call - empty list. On subsequent calls , refined by user based on structured and unstructured domain data returned from the initial call Sample response with Unstructured data highlight:
```
        "hits " : {
                "total": 5,   ~202
{
        "_index " : "adi-rn7czd" ,
        "_type" : "eartifact" ,
        "_id " : "4744bca21aef8dc23a3e207293b03adce70a45fb" ,
        "_score " : 2.568012,
        "_source" : {                                                    204
                "languageCd" : "UNKN" ,
                "fileName " : "zmobile health care app documentation.pdf" ,
                "attachment" : {
                        "date" : "2016-03-09T14:14:11Z" ,
                        "content_ type" : "application/pdf " ,
                        "author" : "Joe Programmer" ,
                        "content_length" : 23026
                },
                "name " : "zmobile health care app documcntation.pdf" ,
                "fileSha1Hash" : "034362e09fe957d2c4bc3e9aa9c3662883fd0e4b" ,
                "fileModified" : "2017 - 11-16T13:28:18.000-08:00"
        },                                                 206              206
        "highlight" : {
                "attachment.content": ["app\n\nHCPA Add <mark>patient</mark>\n\nHCP1 Inquire <mark>patient</mark>\n
        }
}
```
Same response with Unstructured and Structured data highlight:
```
{
        "_index" : "adi-rn7czd" ,
        "_type" : "eartifact" ,
        "_id " : "042832aa118167b28915d0f630fbbb3a74f87e16" ,
        "_score " : 2.3467975,
        "_source" : {
                "fileName " : "COBOL/HCIPDB01.cbl " ,           210
                "languageCd" : "COB" ,
                "attachment" : {
                        "content_type " : "text/plain; charset =ISO-8859-1" ,
                        "content_length" : 8471
                },
                "name" : "HCIPDB01.cbl" ,
                "fileSha1Hash" : "570509e3c81a6e1be604d19ad50ef0500e3af298" ,
                "fileModified" : "2017-09-27T17:22:46.000-07;00"
        },                                        206
        "highlight " : {
                "attachment . content" : [ "Inquire <mark>Patient</mark>
                "symbolsUserDefined" : [ "CA-<mark>PATIENT </mark>-ID"]
        }
                                    208
}
```

FIG. 2A

Sample refinement:

Artifact Language ~252
(x) COBOL
( ) Assembler

250

Artifact Type ~254
(x) Main Source file
( ) Included Source file

Contains ~256
(x) EXEC CICS
( )EXEC SQL

Search within ~258
(x) Symbols
( ) Literals

260

Subsequent refined search request:
GET
/adi/search/eartifact?query=(offset=0 | limit=10 | term=patient)&filterParams=(languageCD = [COB] | fileTypeCd=[MAIN] |  execCICS= [] | symbolsUserDefined=[patient])

Note filterParams are refined with Structured refinements

Sample refined response
"hits" : {
    "total": 1
{                                                                                          270
    "_index" : "adi-rn7czd",
    "_type" : "eartifact",
    "_id" : "042832aa118167b28915d0f630fbbb3a74f87e16",
    "_score" : "5.2303905,
    "_source" : {
        "file Name" : "COBOL/HCIPDB01. cbl ",
        "languageCd" : "COB ",
        "attachment" : {
            "content_type" : "text/plain; charset=IS0-8859-1",
            "content_ length' : 8471
        },
        "name" : "HCIPDB01.cbl ",
        " fileSha1Hash" : "570509e3c81a6e1be604d19ad50ef0500e3af298",
        "fileModified" : "2017-09-27T17: 22 :46.000-07:00",
    },
    "highlight" : {
        "attachment.content" :  [ "Inquire <mark>Patient</mark>
        "symbolsUserDefined" :  [ "CA-<mark>PATIENT</mark>-ID" ]
    }
}

FIG. 2B

PERFORM A FIRST TYPE OF SEARCH ON SOURCE CODE OF A COMPUTER PROGRAM TO SEARCH FOR ONE OR MORE SELECT TERMS IN THE SOURCE CODE ~300

INCLUDE RESULTS OF THE FIRST TYPE OF SEARCH IN A RESULT SET, BASED ON RESULTS RESULTING FROM THE FIRST TYPE OF SEARCH ~302

PERFORM A SECOND TYPE OF SEARCH ON THE COMPUTER PROGRAM TO SEARCH FOR THE ONE OR MORE SELECT TERMS IN ONE OR MORE PARTICULAR ELEMENTS OF THE COMPUTER PROGRAM ~304

ADD RESULTS OF THE SECOND TYPE OF SEARCH TO THE RESULT SET, BASED ON RESULTS RESULTING FROM THE SECOND TYPE OF SEARCH ~306

308

PERFORM ANOTHER SEARCH, BASED ON ANALYSIS OF THE RESULT SET, THE OTHER SEARCH SEARCHING FOR THE ONE OR MORE SELECT TERMS IN ONE OR MORE SELECTED SOURCE ARTIFACTS OF THE COMPUTER PROGRAM TO PROVIDE A REFINED RESULT SET ~310

PERFORM AN ACTION USING THE REFINED RESULT SET ~312

THE FIRST TYPE OF SEARCH INCLUDES AN UNSTRUCTURED SEARCH IN WHICH THE SOURCE CODE IS TREATED AS TEXTUAL DATA ~314

THE SECOND TYPE OF SEARCH INCLUDES A STRUCTURED SEARCH THAT DETERMINES THE ONE OR MORE PARTICULAR ELEMENTS OF THE COMPUTER PROGRAM TO BE SEARCHED ~316

THE STRUCTURED SEARCH INCLUDES PERFORMING CLASSIFICATION TO DETERMINE THE ONE OR MORE PARTICULAR ELEMENTS OF THE COMPUTER PROGRAM TO BE SEARCHED FOR THE ONE OR MORE SELECT TERMS ~318

FIG. 3A

THE ONE OR MORE PARTICULAR ELEMENTS ARE SELECTED FROM A GROUP CONSISTING OF: USER-DEFINED SYMBOLS, COMMENTS, LITERALS, ABSENCE OF CERTAIN CONTROL FLOW, AND PRESENCE OF CERTAIN CONTROL FLOW —320

THE ONE OR MORE SELECTED SOURCE ARTIFACTS INCLUDE ONE OR MORE SPECIFIC FILES OF THE COMPUTER PROGRAM —322

THE ONE OR MORE SELECTED SOURCE ARTIFACTS INCLUDE ONE OR MORE SPECIFIC SECTIONS OF THE COMPUTER PROGRAM —324

THE ACTION IS ONE SELECTED FROM THE GROUP CONSISTING OF: GENERATING A REPORT, IMPLEMENTING A BUSINESS PROCESS, EXTRACTING BUSINESS VALUE, CREATING EXTERNAL INTERFACES, AND TRANSFORMING THE COMPUTER PROGRAM FROM ONE PROGRAMMING LANGUAGE TO ANOTHER PROGRAMMING LANGUAGE —326

THE PERFORMING THE OTHER SEARCH INCLUDES SELECTING, BY A SUBJECT MATTER USER, BASED ON ANALYSIS OF THE RESULT SET, THE ONE OR MORE SELECTED SOURCE ARTIFACTS TO BE SEARCHED FOR THE ONE OR MORE SELECTED TERMS —328

FIG. 3B

REFINING SEARCH RESULTS GENERATED FROM A COMBINATION OF MULTIPLE TYPES OF SEARCHES

STATEMENT REGARDING PRIOR DISCLOSURES

The following disclosure(s) are submitted under 35 U.S.C. 102 (b)(1)(A):

DISCLOSURE(S): IBM Publication, "IBM Application Delivery Intelligence V5.0.4," https://www.ibm.com/support/knowledgecenter/en/SSKK7E_5.0.4/com.ibm.adi.product.doc/topics/topiclink.html, Dec. 14, 2017 (pages 1-33); and IBM Publication, "Performing The Business Terms Discovery," https://www.ibm.com/support/knowledgecenter/en/SSKK7E_5.0.4/com.ibm.adi.produc t.doc/topics/biz-disctut.html, Dec. 14, 2017 (pages 1-23).

BACKGROUND

One or more aspects relate, in general, to processing within a computing environment, and in particular, to searching computer programs for particular terms.

Computer programs may be searched for particular terms using various types of searches. One type of search is an unstructured search, in which the computer program source code is treated as unstructured text data, and the unstructured data is searched for the particular terms. Another type of search is a structured search, in which the search is based on the structure of the computer program source. This type of search is based on direct knowledge or an educated guess of the structure of the searched program source.

SUMMARY

Shortcomings of the prior art are overcome and additional advantages are provided through the provision of a computer program product for facilitating searching of computer programs. The computer program product includes a computer readable storage medium readable by a processing circuit and storing instructions for performing a method. The method includes performing a first type of search on source code of a computer program to search for one or more select terms in the source code. Results of the first type of search are included in a result set, based on results resulting from the first type of search. A second type of search is performed on the computer program to search for the one or more select terms in one or more particular elements of the computer program. Results of the second type of search are added to the result set, based on results resulting from the second type of search. Another search is performed, based on analysis of the result set, the other search searching for the one or more select terms in one or more selected source artifacts of the computer program to provide a refined result set. An action is performed using the refined result set.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 2A-2B depict an example search interaction, in accordance with an aspect of the present invention;

FIGS. 3A-3B depict details associated with one example of searching computer programs, in accordance with one or more aspects of the present invention;

DETAILED DESCRIPTION

Figure 1A:
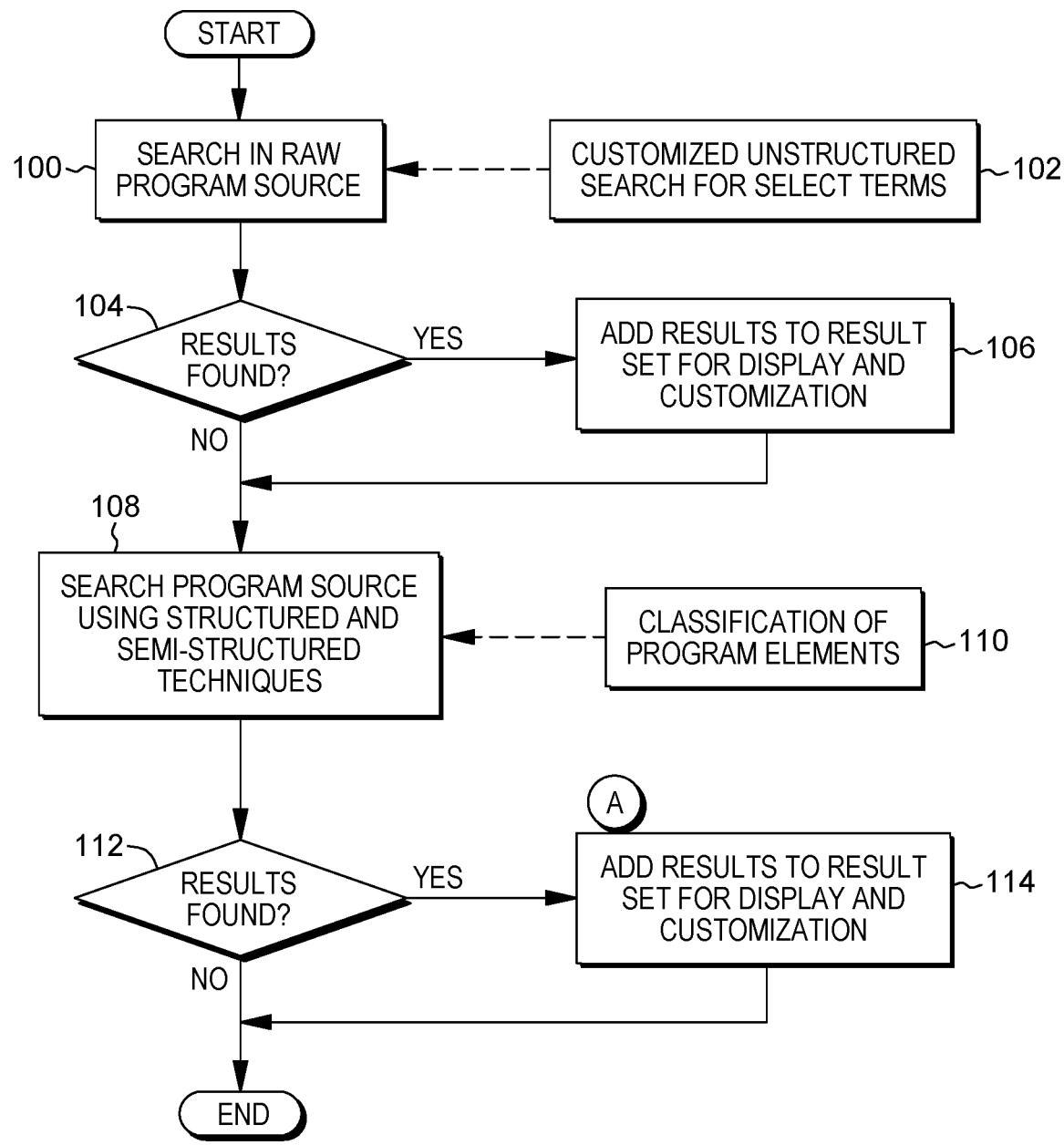
FIG. 1A depicts one example of logic to perform unstructured and structured searching, in accordance with one or more aspects of the present invention.

In accordance with one or more aspects, a searching capability is provided that combines multiple types of searching, including, for instance, unstructured and structured searching, to obtain a result, and then applies user domain knowledge to navigate and refine the search to provide refined search results.

An unstructured search searches unstructured text data. Therefore, to perform an unstructured search on a computer program, the source code of the computer program is treated as unstructured textual data which is searched for one or more terms using a known algorithm, a heuristic, etc. A structured search is based on the syntax and structure of the data being searched. Therefore, if a structured search is to be performed on a computer program, the structure of the source code of the computer program is considered. This may be direct knowledge of the syntax or structure or an educated guess thereof. The structure may be determined by a compilation or a classification process. The structure may include syntactic or structure elements, such as, for example, literals, user-defined symbols, absence or presence of certain control flow, references to external calls, etc.; as well as semi-structured elements, such as comments. As used herein, the term structured search includes syntactic and/or structured searches and/or semi-structured searches, which may search less structured data, such as comments.

The refined search results may be provided and used by one or more users and/or one or more automatic processes. For example, an action may be taken based on or using the refined results. The action may include, for example, generating reports based on the results and providing the reports to a user or a process; and/or at least, initiating, for instance, one or more of the following: construction of a product or device; automatic routing of information or a product; automatic delivery of a product; controlling of a robot, robotic arm or robotic device; calling for assistance; adjusting global positioning system (GPS) coordinates in a vehicle, such as a car, truck, boat, airplane, helicopter, etc., or in another device; managing customer relationships; implementing a business process; extracting a business value; creating external interfaces; transforming a computer program from one programming language to another programming language; enterprise resource planning; supply chain management; compliance and discovery; business intelligence, etc., as just some examples.

The user may be, for example, a subject matter expert that analyzes the results from the combined unstructured/structured searches, and provides a refined search that further narrows down the search results. For instance, the subject matter expert or other user may indicate particular source artifacts, such as specific files or program sections to be searched. The specific files may include specific types of program source files (such as COBOL, PL/I, Assembler, etc.), selected files that may include user-defined symbols, literals, comments, database names, etc. to be searched; and/or certain files that may contain specific control flow (such as EXEC CICS or EXEC SQL), as examples. The program sections may include the main source file and/or included program source, as examples.

The search terms may be applicable to a particular subject area, such as patient care, or any other subject area. In one embodiment, when a term is assigned to a particular business or part of a business, it is referred to as a business term. Business terms are used to define processes that are used to run a business or a part of a business. Business processes are normally defined in normal human language using business terms which are also normal human terms. In order to implement business processes using business terms, enterprises often use software. Business terms and business processes are translated and transformed into programming languages and programs written in those programming languages. In legacy systems, as an example, business rules and business processes are often hidden and encapsulated by legacy programming languages. Many enterprises have very large legacy programming systems and find it helpful to extract business rules and business processes for many reasons that may include easier and better maintenance, extracting more business value by creating external interfaces to business logic, transforming the legacy systems into more modern programming languages, etc.

When searching for business value in existing legacy programs, search terms applicable to the business function may be used. For example, to find business logic related to handling patient identification, one may search for a term Patient or for a term Patient ID, Patient Identification, etc. The searching may be performed by or on behalf of a software architect, software development professional or business analyst. The user is the entity requesting the search, and may be a subject matter expert, as indicated herein. The subject matter expert could be the software architect, software development professional, business analyst, or another entity requesting the search results. Many examples are possible.

In one or more aspects, the searching capability searches computer program source code written in a programming language, such as COBOL, PL/I, etc. It analyzes computer software artifacts, and is inextricably tied to computer technology. One or more technical fields are improved, including, but not limited to computer searching. Processing speed associated with searching within a computer may be increased, thereby improving computer processing.

One embodiment of the logic to perform a combined, customized and refined search to provide refined search results is described with reference to FIGS. 1A-1B. This logic may be performed by one or more processors.

Figure 1B:
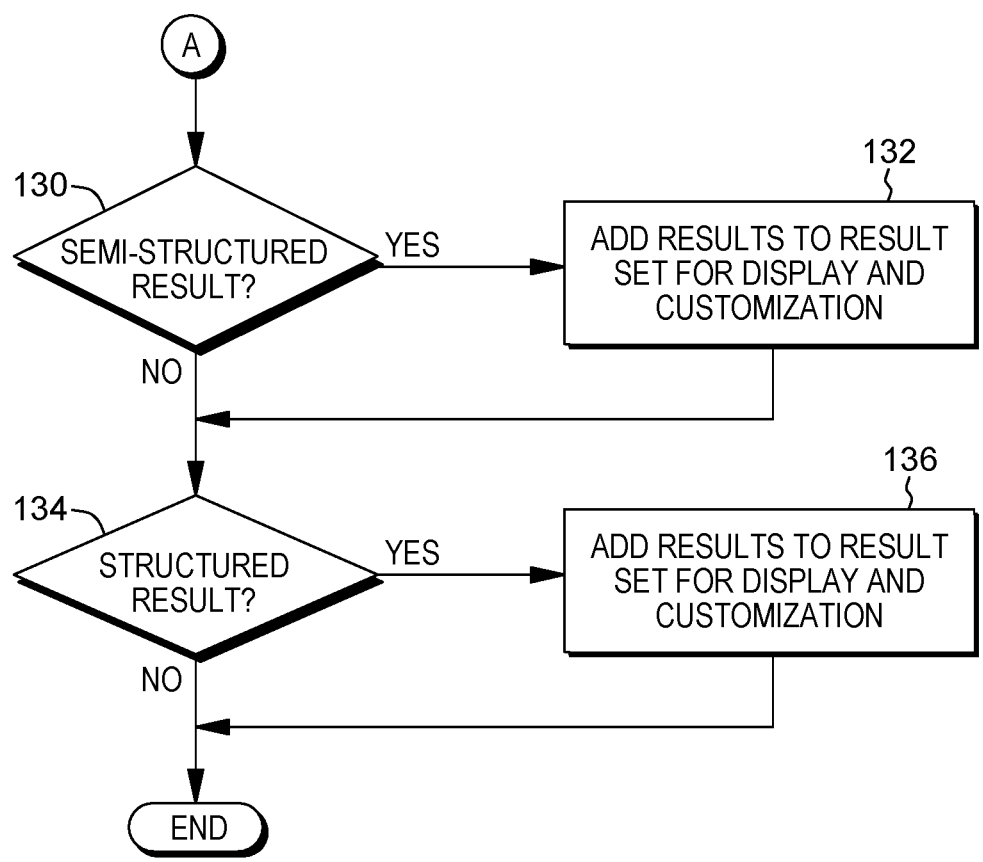
FIG. 1B depicts further details of adding results to a result set, in accordance with one or more aspects of the present invention.

Referring to FIG. 1A, initially, a first type of search is performed in the program source code (e.g., COBOL, PL/I or other program), STEP 100. This search is, for instance, a customized unstructured search for select terms (102), which are entered into the search process by, e.g., a user via, for instance, a graphical user interface or an application programming interface. The program source code is treated as unstructured textual data, which is searched for the select terms using one or more search algorithms. These algorithms may include, for instance, a linear search, binary search, and/or hashing, to name just a few examples. As an example, computer libraries offer search functions that may be used for searching. Many examples exist.

Based on performing the unstructured search, a determination is made as to whether one or more of the select terms were found in the source code, INQUIRY 104. That is, has the search technique found terms in the source code that match the select terms provided by the user? If there are matching terms, then results of the search (e.g., the matching terms and/or related information) are added to a result set, STEP 106. In one example, the results may be formatted, e.g., based on user preferences or as pre-defined, and added to the result set that will later be returned to the user for display and/or to perform an action.

Thereafter, or if no results are found based on the unstructured search, then another search of the computer program is performed, STEP 108. This search is, for instance, a structured search, which may search syntactic, structured and/or semi-structured elements of the code for the select terms. In one example, the structured search uses the domain knowledge of a search process that attempts to first classify the source as being of a specific programming language, and if successful, to further classify and determine basic structure of the source (110). Note that this classification and structure determination are not necessarily by a specific programming language processor, such as a programming language compiler. Instead, it may be by a generic processor or component, such as a Rational Asset Analyzer Classification Scanner that may already exist.

The classification process determines the vocabulary or semi-structured elements, such as, for example, comments; or structured elements of the program in the program source, such as for example, literals, user-defined symbols, absence or presence of certain control flow, and/or presence of references, e.g., to external EXEC calls in COBOL or PL/I programs, where EXEC statements invoke specific transactional processing in CICS systems, or database access using EXEC/SQL.

If the structured search, including the classification process, finds any elements that include the select terms, INQUIRY 112, results of the structured search are added to the result set that may also include results from the unstructured search, STEP 114. For instance, an indication of the type of the source (such as whether the source is known to be a specific language, like COBOL, PL/I, Assembler etc.), indication of the structured vocabulary, indication of flow constructs, and/or indicators of other structured or semi-structured information may be added to the result set.

Further details regarding adding results to the result set, based on the structured search, are described with reference to FIG. 1B. In one embodiment, a determination is made as to whether there are results from searching semi-structured elements, such as comments, INQUIRY 130. If there are results from searching the semi-structured elements, then the results are added to the result set, STEP 132. For example, constructs and/or indicators of semi-structured information may be added to the result set.

Thereafter, or if there are no results to be added to the result set from searching the semi-structured elements, a determination is made as to whether there are results from searching structured elements, such as literals, user-defined symbols, control flow, external calls, etc., INQUIRY 134. If there are results from searching the structured elements, then they are added to the result set, STEP 136. For example, constructs and/or indicators of structured information may be added to the result set.

The result set, containing highlighted search terms in the one or more textual fragments found by the unstructured search, if any, augmented with highlighted search terms in one or more semi-structured and/or structured results, if any, is returned to the user for analysis and further search customization. Further, in one example, if the classification process found control flow indicators and other structured elements, the number of hits containing these elements may also be returned to the user.

The combined result set that includes results, if any, from the unstructured and structured (including semi-structured) searches may be displayed and/or provided to the user for analysis and possible performance of a third type of search. This third type of search searches select source artifacts as described herein, producing a refined result set.

For example, based on obtaining (e.g., receiving, being provided, accessing) the result set, the user has the further ability to refine the search based on analysis of the combined results. As an example, the user has the ability to confine the search to selected source artifacts, such as specific types of the program source files (such as COBOL, PL/I, Assembler etc.); to within files that contain search terms in user-defined symbols, literals, comments, or database table names, etc.; within files containing specific control flow (such as EXEC CICS or EXEC SQL); and/or within specific types of programming source (such as main program source or included program source). Many examples exist.

By performing the confined search, a more tailored and refined result set is generated, which may be displayed and/or used in performing an action.

One example of a search request is depicted in FIG. 2A. The initial search request 200 includes, for instance, GET /adi/search/eartifact?query= (offset=0|limit=10|term=patient)& filterParams=( ). In this example search request, the term patient is to be searched in the computer program source code.

Initially, an unstructured search is performed in the source code looking for patient. In this particular example, there are 5 (202) matches, and a sample response 204 with the unstructured data highlighted 206 is shown. The highlighted information (or at least a portion of it) is added to a result set.

The same search for patient is performed in the structured and/or semi-structured elements of the computer program and results 208 (or a portion thereof) are added to the result set. A sample response 210 depicting the unstructured results 206 and the structured results 208 is shown, as one example.

Thereafter, as shown in FIG. 2B, based on the result set that includes the combined results from the unstructured and structured searches, refined search criteria are determined. A sample refinement 250 includes one or more source artifacts, including, for instance, the language 252 of the source program, which specific types of files 254 to search (e.g., main source file), whether particular file(s) 256 contain specific control flow 256 (e.g., EXEC CICS), and/or file(s) 258 that contain, e.g., the term "patient" in syntactic elements, such as, in program symbols. A sample refined search request 260 is:

GET /adi/search/eartifact?query= (offset=0|limit=10|term=patient)&filterParams=(languageCD=[COB]|fileTypeCd=[MAIN]|execCICS=[ ]|symbolsUserDefined=[patient])

The filterParams are refined with structured refinements that include source artifacts.

A sample refined response 270 is shown in FIG. 2B.

Further details associated with one example of searching computer programs, in accordance with one or more aspects of the present invention, are described with reference to FIGS. 3A-3B.

Referring to FIG. 3A, a first type of search is performed on source code of a computer program to search for one or more select terms in the source code (300). Results of the first type of search are included in a result set, based on results resulting from the first type of search (302). A second type of search is performed on the computer program to search for the one or more select terms in one or more particular elements of the computer program (304). Results of the second type of search are added to the result set, based on results resulting from the second type of search (306). Another search is performed, based on analysis of the result set (308). The other search searches for the one or more select terms in one or more selected source artifacts of the computer program to provide a refined result set (310). An action is performed using the refined result set (312).

As an example, the first type of search includes an unstructured search in which the source code is treated as textual data (314). Further, as one example, the second type of search includes a structured search that determines the one or more particular elements of the computer program to be searched (316). In one particular example, the structured search includes performing classification to determine the one or more particular elements of the computer program to be searched for the one or more select terms (318).

Moreover, referring to FIG. 3B, as examples, the one or more particular elements are selected from a group consisting of: user-defined symbols, comments, literals, absence of certain control flow, and presence of certain control flow (320). Further, as examples, the one or more selected source artifacts include one or more specific files of the computer program (322), and/or one or more specific sections of the computer program (324).

In one embodiment, the action is one selected from the group consisting of: generating a report, implementing a business process, extracting business value, creating external interfaces, and transforming the computer program from one programming language to another programming language (326).

Moreover, in one embodiment, the performing the other search includes selecting, by a subject matter user, based on analysis of the result set, the one or more selected source artifacts to be searched for the one or more selected terms (328).

Other variations and embodiments are possible.

One example of a computer system that includes processors that may be used by one or more aspects of the present invention is described with reference to FIG. 4A. In this example, the computer system is part of a computing environment including additional components that may or may not be used by aspects of the present invention.

In one example, the computing environment may be based on the z/Architecture, offered by International Business Machines Corporation, Armonk, New York. One embodiment of the z/Architecture is described in "z/Architecture Principles of Operation," IBM Publication No.

SA22-7832-10, March 2015, which is hereby incorporated herein by reference in its entirety. Z/ARCHITECTURE is a registered trademark of International Business Machines Corporation, Armonk, N.Y., USA.

In another example, the computing environment may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 4A:
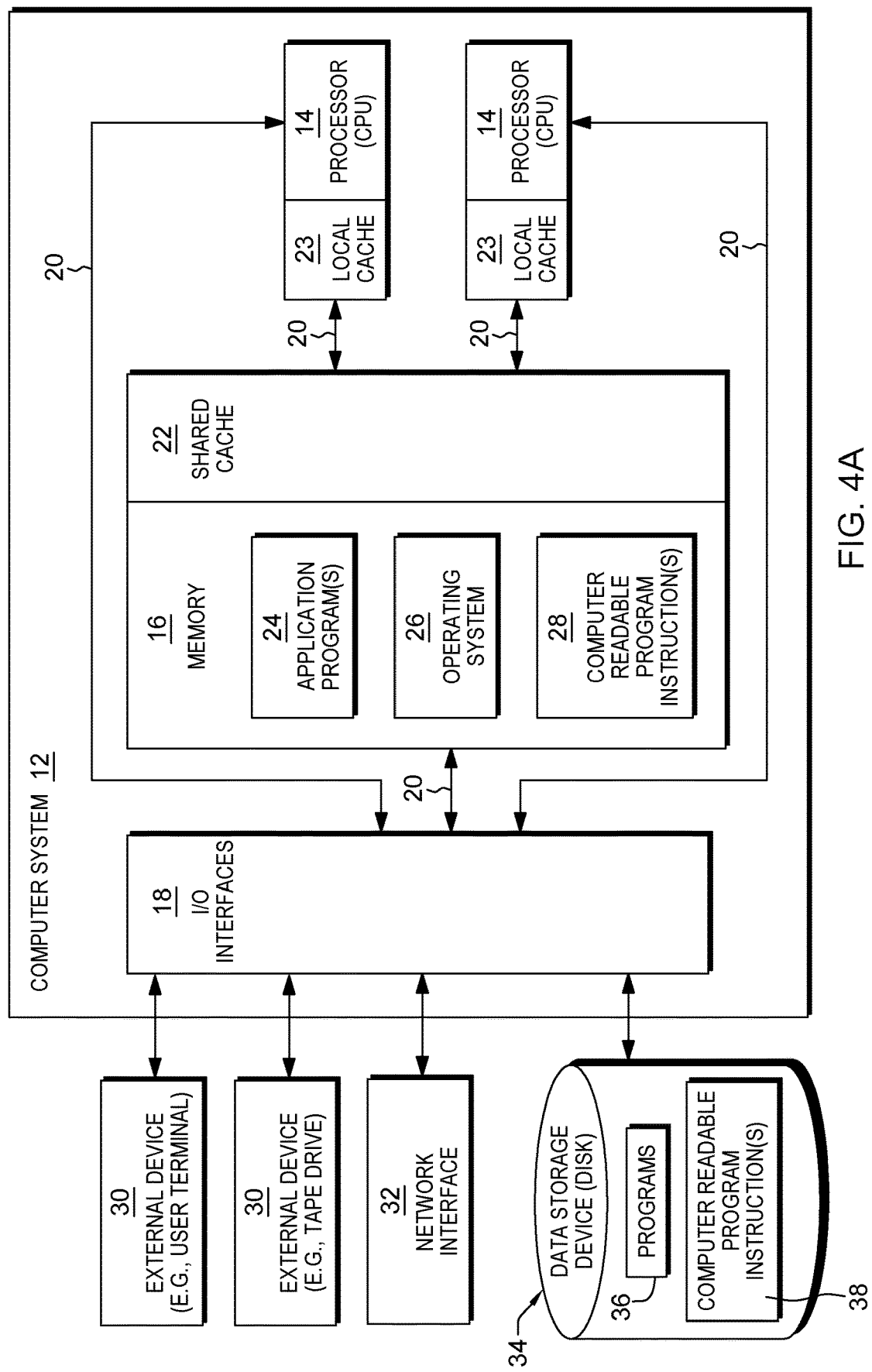
FIG. 4A depicts one example of a computing environment to incorporate and use one or more aspects of the present invention.

As shown in FIG. 4A, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30, one or more network interfaces 32, and/or one or more data storage devices 34. Example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 may store one or more programs 36, one or more computer readable program instructions 38, and/or data, etc. The computer readable program instructions may be configured to carry out functions of embodiments of aspects of the invention.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, may execute one or more components to perform one or more aspects of the present invention. These components may be stored in memory, including main memory (e.g., memory 16) and/or one or more caches (e.g., shared cache 22, local cache 23) and/or external storage (e.g., device 34), and may be executed by one or more processors (e.g., processor 14).

Figure 4B:
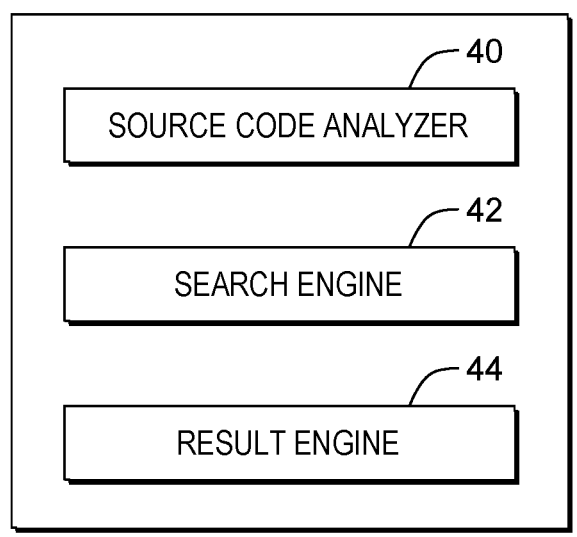
FIG. 4B depicts further details of a processor of FIG. 4A, in accordance with one or more aspects of the present invention.

In one example, referring to FIG. 4B, the components may include a source code analyzer 40 to analyze the source code of a computer program (e.g., program 24), and determine, for instance, one or more structured and/or semi-structured elements of the source code. For instance, source code analyzer 40 may include a Rational Asset Analyzer Classification Scanner or another product or process to perform classification.

The determined elements, as well as textual data of the source code, may be searched by a search engine 42 that performs multiple types of searching (e.g., unstructured, structured, and/or confined). The results of any of the searches by the search engine may be provided to a result engine 44 that may format the results in a pre-specified manner and/or display or provide the results to be used.

As described herein, in one or more aspects, search results from multiple types of searches (e.g., unstructured and structured) are combined in a result set. The result set is analyzed and domain knowledge is applied to provide another search (e.g., confined) to tailor and narrow the result set, providing a refined result set.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
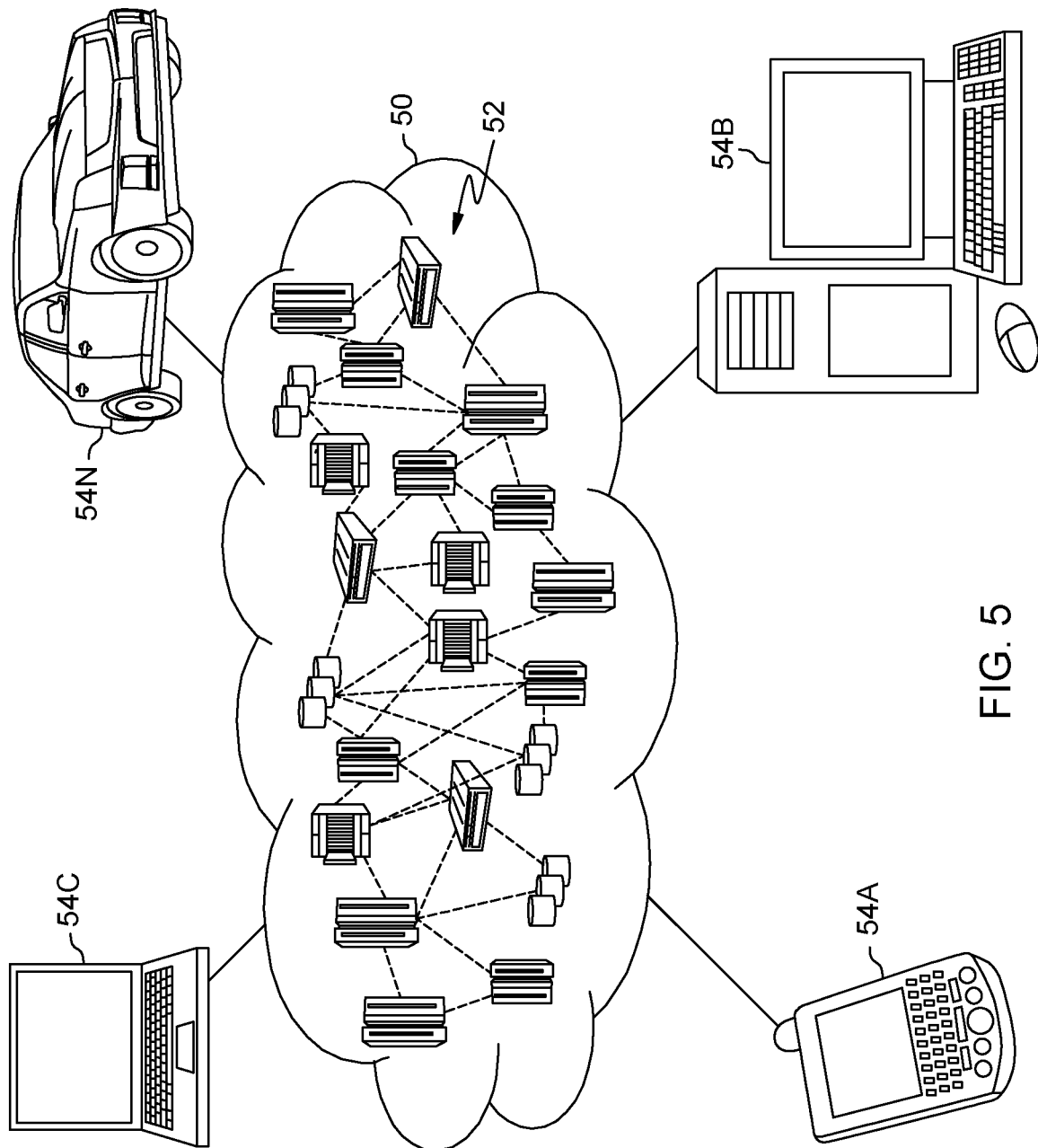
FIG. 5 depicts one embodiment of a cloud computing environment.

Referring now to FIG. 5, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 6:
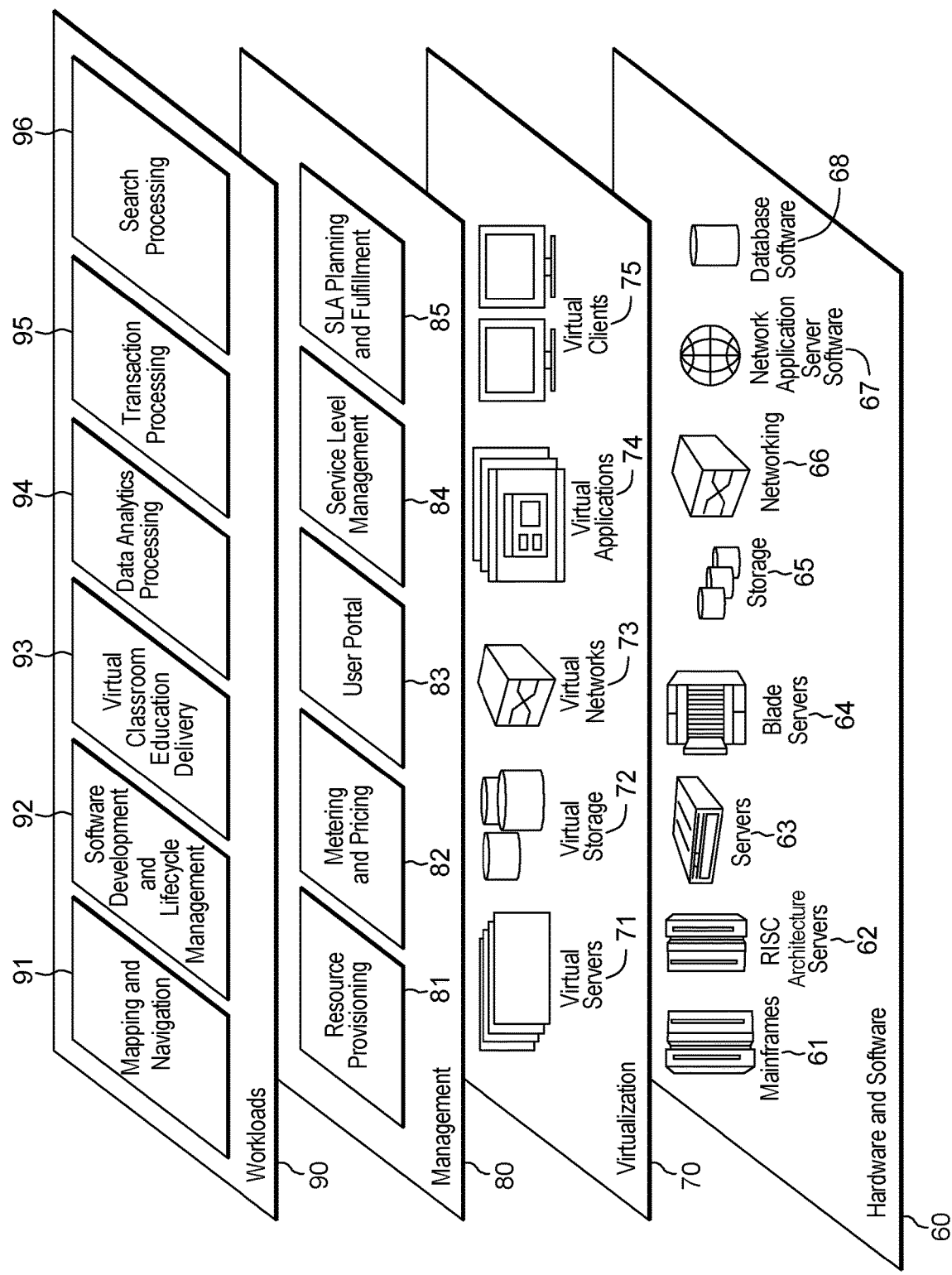
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and search processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different types of searches may be used and/or programs of different languages may be searched. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating searching of computer programs, the computer program product comprising:

a computer readable storage medium readable by a processing circuit and storing instructions for performing a method comprising:

performing a first type of search on source code of a computer program to search for one or more select terms in the source code, wherein the first type of search comprises an unstructured search in which the source code is treated as unstructured textual data and the first type of search searches for the one or more select terms in the unstructured textual data, and wherein the one or more select terms are applicable to a particular subject area, the particular subject area including a particular function of the particular subject area, and wherein the one or more select terms related to the particular function are searched for in the unstructured textual data of the source code;

including results of the first type of search in a result set, based on results resulting from the first type of search;

performing a second type of search on the computer program to search for the one or more select terms in one or more particular elements of the computer program, wherein the second type of search is different from the first type of search and is based on a structure of the computer program, wherein the structure of the computer program includes one or more elements selected from a group consisting of syntactic elements, structure elements and semi-structured elements of the computer program, and wherein the performing the second type of search includes searching the one or more particular elements selected from the group for the one or more select terms;

adding results of the second type of search to the result set, based on results resulting from the second type of search;

performing another search, based on analysis of the result set, the other search searching for the one or more select terms in one or more selected source artifacts of the computer program to provide a refined result set; and performing an action using the refined result set.

2. The computer program product of claim 1, wherein the one or more select terms are assigned to the particular function.

3. The computer program product of claim 1, wherein the semi-structured elements include comments.

4. The computer program product of claim 1, wherein the structured search comprises performing classification to determine the one or more particular elements of the computer program to be searched for the one or more select terms.

5. The computer program product of claim 1, wherein at least one of the syntactic elements and the structure elements includes at least one element selected from a group consisting of: user-defined symbols, literals, absence of certain control flow, presence of certain control flow and reference to external calls.

6. The computer program product of claim 1, wherein the one or more selected source artifacts include one or more specific files of the computer program.

7. The computer program product of claim 1, wherein the one or more selected source artifacts include one or more specific sections of the computer program.

8. The computer program product of claim 1, wherein the action is one selected from the group consisting of: generating a report, implementing a business process, extracting business value, creating external interfaces, and transforming the computer program from one programming language to another programming language.

9. The computer program product of claim 1, wherein the performing the other search comprises selecting, by a subject matter user, based on analysis of the result set, the one or more selected source artifacts to be searched for the one or more selected terms.

10. A computer system for facilitating searching of computer programs, the computer system comprising:
a memory; and
a processor in communication with the memory, wherein the computer system is configured to perform a method, the method comprising:
performing a first type of search on source code of a computer program to search for one or more select terms in the source code, wherein the first type of search comprises an unstructured search in which the source code is treated as unstructured textual data and the first type of search searches for the one or more select terms in the unstructured textual data, and wherein the one or more select terms are applicable to a particular subject area, the particular subject area including a particular function of the particular subject area, and wherein the one or more select terms related to the particular function are searched for in the unstructured textual data of the source code;
including results of the first type of search in a result set, based on results resulting from the first type of search;
performing a second type of search on the computer program to search for the one or more select terms in one or more particular elements of the computer program, wherein the second type of search is different from the first type of search and is based on a structure of the computer program, wherein the structure of the computer program includes one or more elements selected from a group consisting of syntactic elements, structure elements and semi-structured elements of the computer program, and wherein the performing the second type of search includes searching the one or more particular elements selected from the group for the one or more select terms;
adding results of the second type of search to the result set, based on results resulting from the second type of search;
performing another search, based on analysis of the result set, the other search searching for the one or more select terms in one or more selected source artifacts of the computer program to provide a refined result set; and
performing an action using the refined result set.

11. The computer system of claim 10, wherein the one or more select terms are assigned to the particular function.

12. The computer system of claim 10, wherein the semi-structured elements include comments.

13. The computer system of claim 10, wherein at least one of the syntactic elements and the structure elements includes at least one element selected from a group consisting of: user-defined symbols, literals, absence of certain control flow, presence of certain control flow and reference to external calls.

14. The computer system of claim 10, wherein the one or more selected source artifacts include one or more specific files of the computer program.

15. The computer system of claim 10, wherein the one or more selected source artifacts include one or more specific sections of the computer program.

16. The computer system of claim 10, wherein the performing the other search comprises selecting, by a subject matter user, based on analysis of the result set, the one or more selected source artifacts to be searched for the one or more selected terms.

17. A computer-implemented method of facilitating searching of computer programs, the computer-implemented method comprising:
performing, by a processor, a first type of search on source code of a computer program to search for one or more select terms in the source code, wherein the first type of search comprises an unstructured search in which the source code is treated as unstructured textual data and the first type of search searches for the one or more select terms in the unstructured textual data, and wherein the one or more select terms are applicable to a particular subject area, the particular subject area including a particular function of the particular subject area, and wherein the one or more select terms related to the particular function are searched for in the unstructured textual data of the source code;
including results of the first type of search in a result set, based on results resulting from the first type of search;
performing a second type of search on the computer program to search for the one or more select terms in one or more particular elements of the computer program;
wherein the second type of search is different from the first type of search and is based on a structure of the computer program, wherein the structure of the computer program includes one or more elements selected from a group consisting of syntactic elements, structure elements and semi-structured elements of the computer program, and wherein the performing the second type of search includes searching the one or more particular elements selected from the group for the one or more select terms;

adding results of the second type of search to the result set, based on results resulting from the second type of search;

performing another search, based on analysis of the result set, the other search searching for the one or more select terms in one or more selected source artifacts of the computer program to provide a refined result set; and performing an action using the refined result set.

18. The computer-implemented method of claim 17, wherein the one or more select terms are assigned to the particular function.

19. The computer-implemented method of claim 17, wherein the semi-structured elements include comments.

20. The computer-implemented method of claim 17, wherein the performing the other search comprises selecting, by a subject matter user, based on analysis of the result set, the one or more selected source artifacts to be searched for the one or more selected terms.

\* \* \* \* \*